April 9, 1935. J. T. LUSIGNAN, JR 1,997,064
IMPULSE GENERATOR
Filed March 17, 1934  2 Sheets-Sheet 1

INVENTOR
Joseph T. Lusignan Jr.
BY
ATTORNEY

April 9, 1935.   J. T. LUSIGNAN, JR   1,997,064
IMPULSE GENERATOR
Filed March 17, 1934   2 Sheets-Sheet 2

INVENTOR
Joseph T. Lusignan Jr.
BY
ATTORNEY

Patented Apr. 9, 1935

1,997,064

UNITED STATES PATENT OFFICE 1,997,064

IMPULSE GENERATOR

Joseph T. Lusignan, Jr., Akron, Ohio, assignor to The Ohio Brass Company, Mansfield, Ohio, a corporation of New Jersey Application March 17, 1934, Serial No. 716,210

16 Claims. (Cl. 171—97)

This invention relates to electrical apparatus for generating high voltage impulses for use in high voltage testing and other purposes.

One object of the invention is to provide an impulse generator employing condenser units conveniently arranged for use in a laboratory and yet sufficiently spaced from one another for insulation purposes.

Another object of the invention is to provide a support for the condenser units employed in the impulse generator in which porcelain members may be used for affording insulation.

Another object of the invention is to provide a support for the condenser units in which the insulating members are not subjected to heavy bending stresses.

A further object of the invention is to provide a support for the condenser units so arranged that the stray capacity to ground will be a minimum.

A further object of the invention is to provide a support for the condenser units of an impulse generator having a minimum of solid insulating material between the units and ground to reduce the leakage path to ground to a minimum.

Another object of the invention is to provide a compact condenser support that is readily movable from place to place.

Other objects and advantages will appear from the following description.

The invention is exemplified by the combination and arrangement of parts shown in the accompanying drawings and described in the following specification, and it is more particularly pointed out in the appended claims.

A common form of impulse generator now used in high voltage laboratories is one involving a series-parallel arrangement of condenser units commonly known as the Marx circuit and by means of which a high voltage impulse wave may be obtained from a comparatively low voltage direct current source. In this circuit the condensers are in effect charged in parallel and discharged in series so that a comparatively low voltage source is employed for charging the condensers and substantially any desired voltage may be obtained on the discharge.

Figure 1:
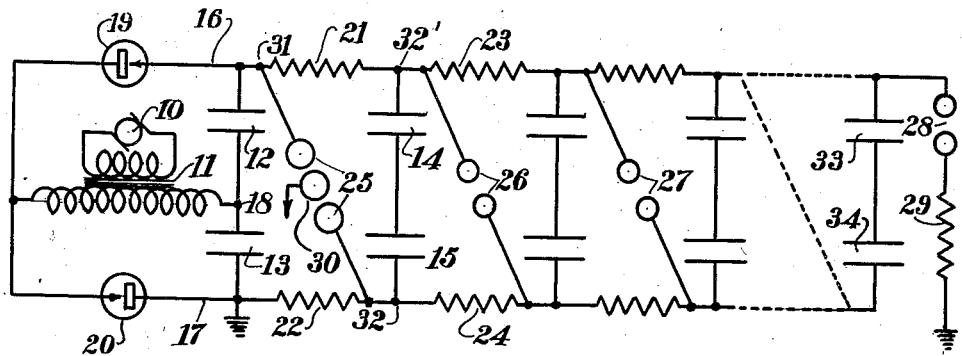
Fig. 1 is a diagram of the connections of an impulse generator to which the present invention is applied.

Fig. 1 shows the connection of such a circuit in which 10 designates an alternating current generator exciting the primary of the transformer 11. Condensers 12, 13, 14, 15, etc., are connected in pairs across the conductors 16 and 17. The inner terminals of the first pair of condensers are connected as shown at 18 to one terminal of the secondary of the transformer 11, and the outer terminals of the condensers are connected to the other terminal of the transformer through rectifier tubes 19 and 20 respectively; the electrodes of the tubes being reversed so that current flows in one direction in the local circuit including the condenser 12, and in the opposite direction in the local circuit including the condenser 13, thus charging the two condensers in series to approximately twice the voltage of the peak of the wave produced by the transformer. The other condensers 14, 15, etc., are connected in pairs across the leads 16 and 17 and are charged in the same manner as the condensers 12 and 13 except that resistances 21, 22, 23, 24, etc., are interposed in the leads between the various pairs of condensers. Discharge gaps 25, 26, 27, etc., are connected between the leads 16 and 17, as shown in the diagram, so that when arcing occurs across the gaps the condensers are effectively connected in series. The resistances 21, 22, 23, 24, etc., while permitting the condensers to be charged by the transformer, are of sufficient amount that they effectually block the flow of high current impulse at the time of discharge, rendering the circuit a substantially series circuit through the condensers and arcing gaps and imposing the high resultant voltage on the gap 28 to ground through the high resistance 29. A test piece to be subjected to the high voltage impulse is connected in parallel with the resistance 29. Discharge may be initiated at any time after the condensers are charged by applying voltage to electrode 30 which is located between the terminals of the gap 25. This will produce a discharge between the points 31 and 32 and thus bring the point 32 to the potential of point 31 since the resistance 22 prevents flow of the charge to ground. This, in turn, will raise the voltage on point 32' and produce discharge across the gap 26 and so on until the total voltage of all of the condensers is imposed upon the final pair 33 and 34. Gap 28 will then discharge at the total voltage thus generated and produce a surge of impulse current through resistance 29. Any apparatus in parallel with resistance 29 will thus have an impulse voltage applied thereto due to the potential drop over resistance 29. One terminal of the first pair of condensers may be grounded but each succeeding pair must be insulated from ground by increasing amounts of insulation, depending upon the position of the pair in the apparatus. The insulation of the final pair from ground must be sufficient to withstand the maximum voltage.

In impulse generators heretofore employed, it has been customary to mount the condensers on an inclined beam usually made of wood as this is practically the only insulating material which may be obtained in sufficient lengths and strength to withstand the bending moments to which it is necessarily subjected in the support of the insulating units. The beam is usually supported at numerous points along its length by stacks of insulators. This arrangement makes a very long support which is inconvenient to install in many laboratories and has other disadvantages, among which are the relatively high stray capacity to ground and relatively numerous leakage paths of solid insulation to ground and the unsatisfactory nature of the insulating material which must be used.

In the present invention the condenser units are supported in a helical path which not only decreases the maximum over-all dimension of the condenser stack but provides an arrangement in which the weight may be balanced so that there are substantially no bending moments on the dielectric material, making possible the use of porcelain or other material of more satisfactory properties than wood and at the same time decreasing the stray capacity to ground and the leakage path to ground. It will be obvious that by confining the condenser units to a narrow vertical column, such as a helix affords, the total capacity to ground will be kept small, thus reducing the stray capacity to ground to a minimum. This increases the efficiency of the set by limiting the amount of voltage lost in charging stray capacity. It also allows better control and calculation of the impulse wave shape.

Figures 2, 3:
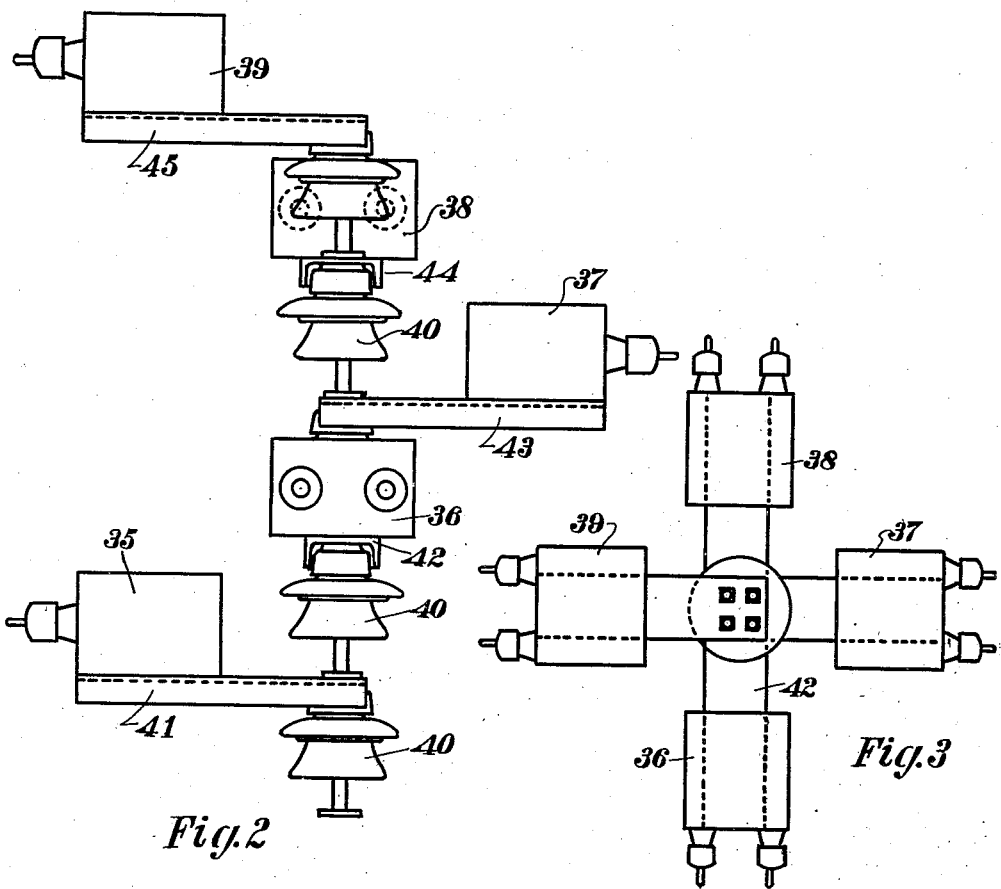
Fig. 2 is an elevation of one form of condenser support according to the present invention.
Fig. 3 is a plan of the arrangement shown in Fig. 2.
Figure 4:
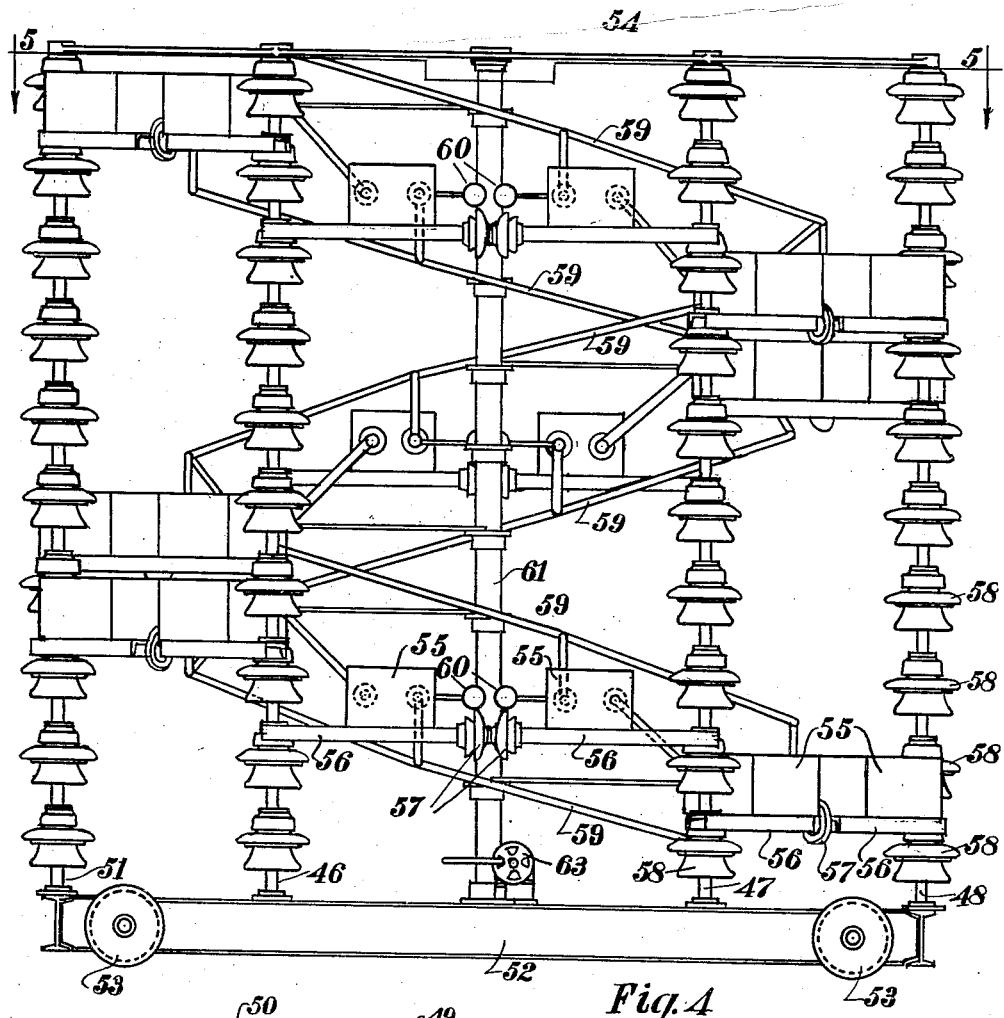
Fig. 4 is an elevation of another form of condenser support embodying the invention.
Figure 5:
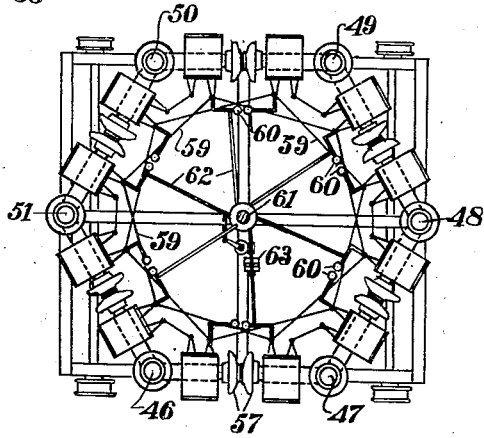
Fig. 5 is a plan on line 5—5 of Fig. 4.

In the form of the invention shown in Fig. 2, the condenser units designated 35, 36, 37, 38 and 39 are supported from a central stack of pillar insulators 40 forming a central vertical post. The lowermost condenser unit 35 is carried on an arm 41 extending laterally from the upper metallic fitting of the lower insulator 40. The arm 41 may be a metal channel bar or other suitable support. The condenser unit 36 is supported on an arm 42 projecting from the top of the second insulator in the stack and offset at an angle to the arm 41. The other arms 43, 44, 45, etc., are each offset upwardly in the stack and angularly relative to the next adjacent arms so that the condenser units 35, 36, 37, 38, 39, etc., are disposed in a gradually rising helix, the insulation of each unit from ground being greater than the next lower unit. The number of condenser units is limited only by the mechanical stability of an insulator stack. It will be apparent that the various condensers are balanced against one another so that there is no resulting bending moment on the stack as a whole, and the maximum bending moment on any insulator unit is limited because of the balanced arrangement of the various units.

Where a larger number of units are required, still greater mechanical strength may be provided by arranging a plurality of stacks in circular formation, as shown in Figs. 4 and 5. In these figures, six stacks are shown at 46, 47, 48, 49, 50 and 51. The stacks are shown as mounted on a supporting frame 52 carried by wheels 53 so that it may be readily moved from place to place as desired. The stacks may be connected by braces 54 which may be either of metal or suitable insulating material, depending upon whether or not the connecting points are of the same or different potentials. The compact arrangement thus provided not only makes it possible to mount the entire stack on a portable frame but also permits connecting bracing to provide a rigid support without excessive stresses in any portion thereof.

In the arrangement shown in Figs. 4 and 5, the units are grouped in sections and a pair of condenser units 55 constituting one section is arranged at each vertical position and the arms 56 which support any particular pair are connected together by insulators 57. It is apparent that each section may comprise a single unit as shown in Fig. 2, or a plurality of units as shown in Fig. 4. The first pair of arms 56 is insulated from the base 52 by a single step of the supporting insulators 58 forming the various stacks. The next pair of arms is raised two steps from the support and so on to any desired height, depending upon the voltage of the impulse to be generated. Removable sections may be provided so as to increase the voltage capacity of the entire assembly or any number of condensers may be connected to the test piece where less than the total voltage capacity is desired.

The numerals 59 designate resistance elements connecting the condenser units and correspond to the resistances 21, 22, 23, etc. of Fig. 1. These resistances are arranged in an ascending helix corresponding to the helical arrangement of the condensers themselves. The arcing gaps 60 connecting the various condenser units at the time of discharge, and corresponding to gaps 25, 26 and 27 of Fig. 1, are preferably made adjustable so as to permit variation of the arcing distance between the gaps. This adjustment may be accomplished by any suitable connection, a central rotary post 61 being provided in the embodiment shown for accomplishing this purpose. The post itself may be of insulating material or it may be connected to the discharge gaps by insulating rods 62. The connection is such that by rotation of the post, the adjustment of all of the gaps may be simultaneously effected. The post may be rotated by a suitable motor 63 which can be controlled from a distance to secure any adjustment desired.

I claim:

1. A condenser assembly comprising a plurality of condenser units, and means for supporting said units in ring formation, the units of said assembly being vertically spaced at progressively increasing heights above the lowermost unit, each unit of said assembly being offset vertically relative to at least one of the units next adjacent thereto circumferentially of said ring formation.

2. A condenser stack comprising a plurality of condenser units disposed in helical formation, the units of said stack being arranged in the helix formed by them at progressively increasing heights from the lowermost unit in the stack and means for charging said units to potentials, progressively increasing according to their said heights.

3. An impulse generator comprising a plurality of condenser units arranged in sections, and insulators supporting said units in helical formation each section of units being offset vertically and circumferentially of said stack relative to the next adjacent section in said stack, and means for charging and discharging said units.

4. An impulse generator comprising a vertical stack of insulators and condenser units carried by said insulators and arranged in sections disposed at progressively increasing heights, said sections of condenser units being angularly offset relative to one another about a vertical axis and each section being vertically offset relative to the sections next adjacent thereto, and means for charging and discharging said condenser units.

5. An impulse generator comprising porcelain insulators arranged in vertical stack formation, and condenser units carried by said insulators, said units being arranged in sections, the sections being disposed in helical formation with each section offset vertically and horizontally relative to the next adjacent sections, and means for charging and discharging said condenser units.

6. An impulse generator comprising a vertical stack of porcelain insulators, vertically spaced arms projecting radially from said stack in angularly offset relation to one another, and condenser units carried by said arms and disposed in a helix about said stack and means for charging and discharging said condenser units.

7. An impulse generator comprising a plurality of stacks of porcelain insulators arranged in a polygon, braces connecting said stacks, and condensers supported by said stacks and means for charging said condensers in parallel and for discharging said condensers in series.

8. In combination a plurality of condenser units and means for supporting said units at various heights, said means comprising a plurality of insulator stacks disposed in a closed figure about a central opening, and bracing means connecting said stacks, said units being arranged in sections on said stacks, each section being offset both vertically and horizontally relative to the next adjacent sections.

9. An impulse generator comprising a plurality of condenser units, means for supporting said units comprising a plurality of vertical insulator stacks disposed in a closed figure about a central opening, and condenser units carried by said stacks in helical formation and in progressively increasing heights above the lowermost unit, means for charging said units and means for connecting said units in series to provide progressively increasing potentials of said units corresponding to their said progressively increasing heights.

10. An impulse generator comprising a portable platform, a plurality of insulator stacks mounted on said platform in a closed figure about a central opening, braces connecting said stacks, and condenser units mounted on said stacks in progressively increasing heights from said platform and means for charging and discharging said condenser units.

11. An impulse generator comprising a plurality of insulator stacks disposed in a closed figure about a central opening, condensers carried by said stacks, and means for charging and discharging said condensers comprising a plurality of discharge gaps, and means for adjusting said gaps said adjusting means having a common operating device disposed within said central opening.

12. An impulse generator comprising a plurality of vertical stacks of porcelain insulators, condenser units carried by said stacks at progressively increasing heights and means for charging said units in parallel and for discharging said units in series.

13. An impulse generator comprising a plurality of stacks of porcelain insulators disposed in a closed figure about a central opening, braces connecting said stacks, and condensers carried by said stacks in helical formation, the condensers being disposed at progressively increasing heights from the lowermost condenser and means for charging and discharging said condensers.

14. An impulse generator comprising a portable base, a plurality of vertical stacks of porcelain insulators mounted on said base in a closed figure about a central opening, condenser units carried by said stacks in helical relation to one another and in progressively increasing heights from said base, and means for charging said condensers and for discharging said condensers in series, said means comprising arcing gaps, a rotary post carried by said base in said central opening and means connecting said post with said discharge gaps to adjust said gaps simultaneously when said post is rotated.

15. A condenser assembly comprising a plurality of condenser units arranged in sections and means for supporting said units in ring formation, said sections being vertically spaced relative to one another and disposed at progressively increasing heights above the lowermost section, each section being offset vertically and horizontally relative to the sections next adjacent thereto.

16. A condenser stack comprising a plurality of condenser units arranged in sections, said sections being disposed in helical formation and disposed at progressively increasing heights from the lowermost section in said stack, and means for charging said units to potentials progressively increasing according to their vertical position in said stack.

JOSEPH T. LUSIGNAN, Jr.